United States Patent [19]

Hund et al.

[11] Patent Number: 5,750,614
[45] Date of Patent: May 12, 1998

[54] PROCESS FOR PREPARING STABLE EMULSIONS OF POLYELECTROLYTES OF HIGH MOLECULAR WEIGHT AS REVERSE EMULSION

[75] Inventors: René Hund, Villars; Sébastien Georges, Villeurbanne, both of France

[73] Assignee: S.N.F., France

[21] Appl. No.: 566,179

[22] Filed: Dec. 1, 1995

[30] Foreign Application Priority Data

Jan. 10, 1995 [FR] France ............... 95 00383

[51] Int. Cl.$^6$ ............................. C08F 2/16
[52] U.S. Cl. ............ 524/460; 524/457; 524/458; 524/519; 524/521
[58] Field of Search ............. 524/458, 457, 524/521, 519, 460

[56] References Cited

U.S. PATENT DOCUMENTS

| | | | |
|---|---|---|---|
| 4,328,149 | 5/1982 | Morse et al. | 524/458 |
| 4,339,371 | 7/1982 | Robinson et al. | 524/310 |
| 4,374,216 | 2/1983 | Dammann | 524/458 X |
| 4,380,600 | 4/1983 | Hosoda et al. | 524/458 |
| 4,521,552 | 6/1985 | Schnee et al. | 524/458 X |
| 4,582,627 | 4/1986 | Carlsson | 252/181 |
| 4,600,641 | 7/1986 | Ogawa et al. | 524/521 X |
| 4,640,954 | 2/1987 | Schnee et al. | 524/521 X |
| 4,806,434 | 2/1989 | Ogawa | 524/458 X |
| 4,835,206 | 5/1989 | Farrar et al. | 524/458 X |
| 4,929,655 | 5/1990 | Takeda et al. | 524/458 |
| 5,006,590 | 4/1991 | Takeda et al. | 524/458 |
| 5,106,903 | 4/1992 | Vanderhoff et al. | 524/458 |
| 5,260,354 | 11/1993 | Kaylo et al. | 523/402 |
| 5,294,658 | 3/1994 | Scholz et al. | 524/457 |
| 5,403,883 | 4/1995 | Messner et al. | 524/458 |
| 5,480,934 | 1/1996 | Messner et al. | 524/458 |

FOREIGN PATENT DOCUMENTS 2337738  8/1977  France.

OTHER PUBLICATIONS

Chemical Abstracts, vol. 118, No. 22, May 1993.

*Primary Examiner*—Judy M. Reddick
*Attorney, Agent, or Firm*—Parkhurst & Wendel, L.L.P

[57] ABSTRACT

A process for preparing stable emulsions of polyelectrolytes of high molecular weight as reverse emulsion, in which:

- the monomers are dissolved in an aqueous phase,
- an organic phase containing a surface-active agent is prepared,
- these two phases are mixed to obtain an emulsion of the water-in-oil (W/O) type,
- the monomers are polymerized,
- the emulsion is incorporated to obtain a water-in-oil (W/O) emulsion, so as to make the polyacrylamide obtained water-soluble, which consists in adding to the aqueous phase a soluble polymer of low molecular weight, of the same general chemical nature and of the same ionic nature as the polyelectrolyte of high molecular weight which is envisaged.

Envisaged application: preparation of polyacrylamide for flocculation and/or thickening applications (urban and industrial water treatments, papermaking).

10 Claims, No Drawings

PROCESS FOR PREPARING STABLE EMULSIONS OF POLYELECTROLYTES OF HIGH MOLECULAR WEIGHT AS REVERSE EMULSION

TECHNICAL BACKGROUND

The invention relates to a process for preparing stable emulsions of polyelectrolytes of high molecular weight as reverse emulsions; it also relates to the emulsions thus obtained and to their industrial applications.

Polyelectrolytes of high molecular weight are well-known soluble synthetic organic homo- or copolymers which are widely employed as flocculating agents or as thickening agents and in many other well-known technical fields. Polyacrylamides are among the most widely recommended soluble polyelectrolytes.

PRIOR ART

The preparation of emulsions of polyelectrolytes, especially of polyacrylamide of high molecular weight as a reverse emulsion is well known (see, for example, documents U.S. Pat. No. 3,734,873, 4,339,371 and 4,777,231 or FR-A-2 390 983 of the Applicant). There is therefore no need to describe it in detail here.

In its main points, this process of preparation consists:

first of all, in dissolving the monomers or mixture of monomers in an aqueous phase;

then in preparing an organic phase of a surface-active agent, sometimes also called surfactant, in mineral or vegetable oil or mixtures;

in mixing these two phases at ambient temperature;

depending on the HLB degree of the surfactant, in more or less shearing the mixture, so as to obtain a water-in-oil (W/O) emulsion;

in degassing, especially with nitrogen;

in polymerizing the emulsion in the presence of known catalysts such as redox mixtures or azo compounds;

and, finally, in incorporating the emulsion using a reversing agent such as $C_{15}$–$C_{16}$ fatty alcohols or ethoxylated nonylphenols, etc., in order to obtain a water-in-oil (W/O) emulsion, so as to make the polyacrylamide obtained water-soluble.

Although very widespread, this technique has the disadvantage of sometimes resulting in the formation of gels during the polymerization. This formation of gels is due chiefly to the presence of impurities in the monomers or in the organic phase, or even in the choice of the operating conditions. As is known, emulsions containing even a small proportion of gels very rapidly become difficult to filter, and this results in blocking of pumps and losses of stability. In short, these emulsions are completely unfit for use.

In fact, emulsions which have a high proportion of gels are most generally burned to destroy them. This consequently results in appreciable financial losses.

It has therefore been suggested to make use of advanced filtration techniques, for example by means of counterrotating filters. However, even if the gels formed during the polymerization are successfully extracted, the final emulsion obtained remains very unstable and develops new gels with time, and these once again render it unfit for its use.

In practice, so far no satisfactory solution has been found making it possible to recover polyacrylamide emulsions in which gels could have formed accidentally.

The invention remedies these disadvantages.

BRIEF DESCRIPTION OF THE INVENTION

The process according to the invention for preparing stable emulsions of polyelectrolytes of high molecular weight as reverse emulsion, especially of polyacrylamide, in which:

the monomers are dissolved in an aqueous phase;

an organic phase containing a surface-active agent is prepared;

these two phases are mixed to obtain an emulsion of the water-in-oil (W/O) type;

the monomers are polymerized;

the emulsion is incorporated to obtain a water-in-oil (W/O) emulsion so as to make the polyelectrolyte obtained water-soluble, which consists in adding a soluble polymer of low molecular weight, of the same general chemical nature and of the same ionic nature as the polyelectrolyte of high molecular weight which is envisaged.

In other words, to prevent the formation of gels, the invention consists, in a process for manufacture of polyelectrolyte of high molecular weight as reverse emulsion, in introducing into the aqueous phase a synthetic and water-soluble polymer of low molecular weight, exhibiting the same general chemical and ionic characteristics as the polymer of high molecular weight which is envisaged, but not necessarily exhibiting the same ion charge density, nor exactly the same chemical composition.

The chemical nature of this compound may be advantageously the same as that of the polyelectrolyte. It may also be a compound of a closely related nature, such as, for example, a counterion, such as DMS-DAMA and chloromethylated DAMA.

In one embodiment, the invention consists in introducing a coagulating agent of the same ion charge as the polyelectrolyte of high molecular weight which is envisaged into the aqueous phase before the mixing with the organic phase.

In practice the polymer of low molecular weight is introduced with light stirring and in the form of aqueous solution which has a concentration by weight of at least 15%, advantageously at least 25%, preferably 30%. It has been noted that if the aqueous solution of the polymer of low molecular weight is less than 25% by weight, the water introduced dilutes the final polyelectrolyte unnecessarily. On the other hand, if the concentration exceeds 50%, the solution becomes very viscous and difficult to handle. As a result, solutions which have a concentration of active substance close to 30% are advantageously employed. This solution is added in a proportion of 2.5 to 20% by weight of the weight of the final emulsion.

As stated, the aqueous solution of soluble polymer of low molecular weight is introduced into the aqueous phase before emulsifying, that is to say before the mixing of the two phases, aqueous and organic respectively, and this is done in a proportion of 2.5 to 20% by weight relative to the weight of the final emulsion. It has been noted, in fact, that if the concentration of the aqueous solution is less than 2.5%, an indifferent effect is obtained. If this concentration exceeds 20%, the mixture becomes too viscous, and this entails substantial difficulties in application.

Good results are obtained with quantities of aqueous solution introduced which are between 5 and 15% of the weight of the final emulsion.

As already stated, this mixing is done at ambient temperature with stirring (50 to 100 revolutions/minute) for the period necessary to homogenize the whole.

The proportions indicated may vary according to the polymers used.

A homopolymer or a copolymer of (meth)acrylamide, of (meth)acrylic acid or of their salts, of cationized or uncationized acrylate or methacrylate ester or of diallyldimethylammonium chloride may be employed as soluble polymer of low molecular weight. The molecular weight of this compound is advantageously lower than 500,000 and is preferably close to 100,000.

The polyelectrolyte of high molecular weight is advantageously a polyacrylamide of molecular weight which is higher than a million, preferably higher than five million and advantageously ten million and above. As already stated, the polyacrylamide may be cationic, nonionic, anionic or even amphoteric. According to the essential feature of the invention, it is important that the soluble polymer of low molecular weight should be of the same ionic nature and the same chemical nature as the polymer of high molecular weight which is envisaged.

In a first embodiment the polymer of high molecular weight is a cationic homopolymer or copolymer of acrylamide and of an unsaturated cationic ethylenic monomer, chosen from the group including dimethylaminoethyl acrylate (DAMEA), dimethylaminoethyl methacrylate (DAMEMA), which are quaternized or in salt form, dimethyldiallylammonium chloride (DADMAC), acrylamidopropyltrimethylammonium chloride (APTAC), and methacrylamidopropyltrimethylammonium chloride (MAPTAC).

In a second embodiment the polyacrylamide is a homopolymer or an anionic copolymer of acrylamide and of acrylic or methacrylic acid, of acrylamidomethylpropylsulfonic acid (AMPS) or their neutralized form.

In another embodiment the polyacrylamide may be nonionic, for example it may be a polymer of acrylamide or of methacrylamide.

The invention applies to any comparable type of (co) polymer.

The way in which the invention may be implemented and the advantages which stem therefrom will emerge better from the examples of embodiment which follow.

WAYS OF IMPLEMENTING THE INVENTION

EXAMPLE 1

Preparation of a cationic acrylamide (DAMADMS) copolymer of low molecular weight The following are charged at ambient temperature into a jacketed reactor:

385 kg of acrylamide at a concentration of 50% in water;
214 kg of dimethylaminoethyl acrylate quaternized with dimethyl sulfate (DAMADMS), at a concentration of 80% in water;
401 kilograms of water.

The pH is adjusted to 5 by addition of sulfuric acid.

The mixture is cooled, with stirring, to 10° C. by passing glycol-containing water through the reactor jacket and is degassed with nitrogen for approximately thirty minutes. The initiation of the polymerization is then performed by successive addition of:

three kilograms of ammonium persulfate;
one kilogram of sodium metabisulfite;
twenty grams of Mohr's salt.

An exothermicity of 70° C. is observed over ten minutes.

A liquid is then obtained, consisting of a cationic acrylamide/DAMADMS copolymer exhibiting a Brookfield viscosity (spindle 3 at 30 revolutions/min at 25° C.) of 1500 mPa s and a concentration of 36% in water. This liquid has a cationicity of 19 moles percent.

EXAMPLE 2

Preparation of a cationic acrylamide/DAMADMS copolymer of high molecular weight according to the prior art Into a twenty-ton reactor are charged 5920 kilograms of an organic phase consisting of a hydrocarbon mixture (a cut) marketed by EXXON under the trademark "EXSOL D 100", to which are added 540 kilograms of a surface-active agent consisting of a sorbitan monooleate and 9.2 kilograms of azoisobutyronitrile, widely known under the name AZDN.

An aqueous phase is prepared in a dissolving vessel by mixing 9240 kilograms of acrylamide at a concentration of 50% in water and 3860 kilograms of dimethylaminoethyl acrylate cationized with dimethyl sulfate (DAMADMS) at a concentration of 80% in water.

To this aqueous phase are added 1540 grams of potassium bromate and 11,540 kilograms of a complexing agent based on diethylenetriaminepentaacetic acid at a concentration of 40% in water, marketed by Dow under the trademark "VERSENEX 80".

2.32 kilograms of sodium formate (transfer agent) are then added.

The aqueous phase is transferred into the organic phase with light stirring (60 revolutions/min). The mixture is then moved to a homogenizer, also called an emulsifier vessel, intended to shear it at ambient temperature. A W/O emulsion is then obtained, which is degassed with nitrogen for approximately thirty minutes.

The polymerization is initiated and then conducted by adding sodium sulfite continuously to the emulsion, so as to maintain an exothermicity of 0.1° C. per ten seconds.

Twenty tons of a cationic emulsion of polyacrylamide of high molecular weight (close to 13.5 million) are then obtained, exhibiting an UL viscosity of 5 mPa s (measured at a concentration of 0.1% of polymer in a molar solution of NaCl at 25° C. at 60 revolutions/min by means of an UL adaptor).

The W/O emulsion obtained is filtered by being passed in a known manner through bags made of polyamide cloth whose mesh has a 300-micrometer opening. When flat, these bags are 500 mm in width and 1600 mm in length.

Fifteen bags are needed to filter all the emulsion. The bags retain the gel formed, which is weighed. 91 kilograms of gels are thus obtained, that is 0.45% of the total weight of the reverse emulsion. These gels are visible to the naked eye and make the emulsion completely unfit for any use; it can therefore only be burnt.

EXAMPLE 3

Preparation of a cationic copolyacrylamide of high molecular weight according to the invention Example 2 is repeated by adding 680 kilograms of liquid copolyacrylamide of low molecular weight of Example 1 to the aqueous phase before it is mixed with the organic phase. During the filtration a single bag suffices for the twenty tons produced.

A W/O emulsion of molecular weight close to 12 million is obtained, exhibiting an UL viscosity of 5.05 mPa s and exhibiting a density of 15 moles percent. 4.6 kilograms of gel, that is 0.023% are obtained after filtration. This gel is not visible to the naked eye.

The W/O emulsion obtained can be employed directly for most of the existing applications, and even the most sensitive ones, such as the retention-draining off application in papermaking.

This example is a perfect illustration of the progress according to the invention, since the same polymer (Example 2), not treated in accordance with the invention, results in the formation of gels in appreciable and detrimental quantity, making the emulsion completely unfit for its use, while, on the other hand, the addition of a quantity of a polymer of low molecular weight makes the emulsion operational.

EXAMPLE 4

Preparation of another cationic copolyacrylamide of high molecular weight

Example 2 is repeated with the same organic phase.

Into the aqueous phase are charged 10.260 kilograms of acrylamide at a concentration of 50%, 2840 kilograms of chloromethylated DAMA at a concentration of 80% in water and 1.085 kilograms of potassium bromate.

A copolyacrylamide is obtained as emulsion exhibiting an UL viscosity of 4.4 mPa s and with a molecular weight close to 10 million, and exhibiting a cationicity of 14 moles percent.

As in Example 2, six bags are needed to filter the twenty tons produced. A quantity of gels of about 0.3% is obtained, visible to the naked eye and making the W/O emulsion unfit for its use.

EXAMPLE 5

Example 4 is repeated by adding 820 kilograms of the liquid cationic copolyacrylamide of Example 1 to the aqueous phase before it is mixed with the organic phase.

A copolyacrylamide is then obtained as W/O emulsion of 4.2 mPa s UL viscosity, of molecular weight close to 10 million and exhibiting a cationicity close to 14 moles/percent.

A single bag suffices to filter this emulsion, which contains only 0.021% of gels not visible to the naked eye. This emulsion is therefore perfectly usable for the known applications of these emulsions.

EXAMPLE 6

Preparation of an anionic acrylamide/acrylic acid copolymer of low molecular weight Using the same process as in Example 1, the following are charged into the reactor:

440 kilograms of acrylamide at a concentration of 50% in water;

94 kilograms of pure acrylic acid, 466 kilograms of water.

These are catalyzed by means of a mixture containing 4 kilograms of ammonium persulfate, 2 kilograms of sodium metabisulfite (SMB) and 20 grams of Mohr's salt.

An anionic copolymer is obtained, with 30 moles/percent, which is in liquid form which has a viscosity of 4000 mPa s at a concentration of 31% in water.

EXAMPLE 7

Preparation of an anionic copolyacrylamide of high molecular weight

The organic phase made up of 208 grams of refined rapeseed oil and 112 grams of rapeseed oil esterified with glycerol is placed in a 1.5-liter reactor, followed by 16 grams of sorbitan monooleate (SPAN 80) and 14 grams of HYPERMER B246 marketed by ICI and 0.4 grams of an AZDN azo catalyst.

The aqueous phase contains 357 grams of an acrylamide at a concentration of 50% in water, 77 grams of pure acrylic acid and a catalyst mixture made up of 180 milligrams of potassium bromate and 0.45 grams of a complexing agent.

This is neutralized with sodium hydroxide to pH 7 and is made up with water to obtain a final weight of the aqueous phase of 650 grams. The two phases are then mixed, degassing is performed and the polymerization is then initiated by adding sodium metabisulfite.

As soon as the first drop of metabisulfite is added the emulsion coagulates, sets solid and is therefore completely unfit for any use whatever. It must therefore be burnt.

EXAMPLE 8

The preceding example is repeated by adding 100 grams of the anionic copolyacrylamide of low molecular weight from Example 6 to the aqueous phase.

After the addition of the sodium metabisulfite a clear W/O emulsion is obtained, exhibiting an UL viscosity of 5.5 mPa s and a molecular weight close to 15 million, which is easily filtered and on which no gel is collected.

Example 7 shows that the method of polymerization using a redox catalyst cannot be envisaged in the conditions described, since it immediately results in a coagulated state.

The same process, when conducted with a pure azo polymerization system (AZDN: 0.4 grams, initiation temperature: 40° C.), and therefore without any oxidizing or reducing agent, makes it possible to obtain a stable emulsion containing a negligible quantity of gel.

EXAMPLE 9

Preparation of an anionic acrylamide-acrylic acid copolymer of high molecular weight The organic phase made up of 107 grams of rapeseed oil transesterified with methanol, marketed by the ROBBE company under the name ESTOROB 926–67 and 198 grams of refined rapeseed oil is placed in a 1.5-liter reactor, finally followed by 24 grams of sorbitan monooleate (SPAN 80) and 14 grams of HYPERMER B246 marketed by ICI and 0.4 grams of an AZDN azo catalyst.

The aqueous phase contains 357 grams of an acrylamide at a concentration of 50% in water, 77 grams of pure acrylic acid and a catalyst mixture made up of 180 milligrams of potassium bromate and 0.45 grams of a complexing agent.

This is neutralized with sodium hydroxide to pH 7 and made up with water to obtain a final weight of the aqueous phase of 650 grams. The two phases are then mixed, degassing is performed and then the polymerization is initiated by adding sodium metabisulfite.

As soon as the first drop of metabisulfite is added the emulsion coagulates, sets solid and is therefore completely unfit for any use whatever. It must therefore be burnt.

EXAMPLE 10

Example 9 is repeated by adding 100 grams of the anionic copolyacrylamide of low molecular weight from Example 6 to the aqueous phase.

After the addition of sodium metabisulfite a clear W/O emulsion is obtained, exhibiting an UL viscosity of 5.5 mPa s and a molecular weight close to 15 million, which is easily filtered and on which no gel is collected.

Example 9 shows that the method of polymerization using a redox catalyst cannot be envisaged in the conditions described, since it immediately results in a coagulated state.

The same process, when conducted with a pure azo polymerization system (AZDN: 0.4 grams, initiation temperature: 40° C.), and therefore without any oxidizing or reducing agent, makes it possible to obtain a stable emulsion containing a negligible quantity of gel.

However, a pure azo polymerization is more sensitive and requires preliminary heating. It also entails more acute problems of control (risk of reaction runaway).

A redox system permits an initiation at ambient temperature and regulation related in a large measure to a simple check on the output of the pump for feeding the reducing agent (metabisulfite).

This leads to an even greater advantage of the present invention, which makes polymerization in a redox system possible without a risk of coagulation.

The process according to the invention has many advantages. The following may be mentioned:

the absence of appreciable formation of gels making the emulsion unusable;

the stabilization of the emulsions in vegetable oil for the recommended redox catalysis system.

The W/O emulsion obtained can be employed directly for most of the existing applications in the field of flocculating agents, or even the most sensitive ones, such as the application in retention-draining off in papermaking, the assisted recovery of the oil in drilling, water treatment, and the like.

What is claimed is:

1. A process for preparing a stable emulsion of a high molecular weight polyelectrolyte by reverse emulsion wherein the formation of gel is prevented, said process comprising:

preparing an organic phase containing a surface active agent;

dissolving the monomer or monomers that will polymerize to form said high molecular weight polyelectrolyte in an aqueous phase;

then, adding to said aqueous phase a low molecular weight, water-soluble polymer of the same chemical nature and of the same ionic nature as the high molecular weight polyelectrolyte to be formed;

then, mixing said organic phase and said aqueous phase to obtain a water-in-oil emulsion;

polymerizing said monomer or monomers in said emulsion; and adding a reversing agent to said emulsion to obtain a water-in-oil emulsion to make the formed polyelectrolyte water-soluble.

2. The process of claim 1, wherein said low molecular weight, water-soluble polymer is a vinyl polymer added to the aqueous phase by stirring and in the form of an aqueous solution having a polymer concentration of at least 25% by weight, said aqueous solution being added to said aqueous phase in a proportion of 2.5 to 20% by weight of the final emulsion.

3. The process of claim 2, wherein the polymer concentration of the aqueous solution is 30% by weight.

4. The process of claim 1, wherein said low molecular weight, water-soluble polymer is a vinyl polymer having a molecular weight of about 100,000.

5. The process of claim 1, wherein said low molecular weight, water-soluble polymer is polydiallyldimethylammonium chloride.

6. The process of claim 1, wherein the formed polyelectrolyte is a polyacrylamide of a molecular weight greater than a million.

7. The process of claim 6, wherein said polyacrylamide has a molecular weight greater than ten million.

8. The process of claim 6, wherein said polyacrylamide is a cationic homopolymer or copolymer of acrylamide and an unsaturated cationic ethylenic monomer selected from the group consisting of dimethylaminoethyl acrylate, dimethylaminoethyl methacrylate, either quaternized or in salt form, dimethylidiallylammonium chloride, acrylamidopropyltrimethylammonium chloride and methacrylamidopropyltrimethylammonium chloride.

9. The process of claim 6, wherein said polyacrylamide is an anionic copolymer of acrylamide and/or of methacrylamide and of acrylic or methacrylic acid.

10. The process of claim 6, wherein said polyacrylamide is nonionic and is a polymer of acrylamide and of methacrylamide.

* * * * *